United States Patent [19]

Ackermann et al.

[11] Patent Number: 5,059,231
[45] Date of Patent: Oct. 22, 1991

[54] INTERNAL COATING OF A GLASS TUBE BY PLASMA PULSE-INDUCED CHEMICAL VAPOR DEPOSITION

[75] Inventors: Ulrich Ackermann, Mainz; Hartmut Bauch, Hochheim; Volker Paquet, Mainz, all of Fed. Rep. of Germany

[73] Assignee: Schott Glaswerke, Mainz, Fed. Rep. of Germany

[21] Appl. No.: 406,402

[22] Filed: Sep. 12, 1989

[30] Foreign Application Priority Data

Sep. 6, 1988 [DE] Fed. Rep. of Germany ....... 3929604
Sep. 12, 1988 [DE] Fed. Rep. of Germany ....... 3830988

[51] Int. Cl.$^5$ .................. C03C 25/02; B05D 3/06; B05D 7/22
[52] U.S. Cl. .................. 65/3.12; 427/39; 427/38; 427/166; 427/237; 427/238; 427/53.1; 65/3.11; 65/18.2
[58] Field of Search .................. 427/38, 39, 166, 165, 427/163, 237, 238, 53.1; 428/426, 34.4; 65/3.12, 3.11, 18.2; 350/96.3

[56] References Cited

U.S. PATENT DOCUMENTS

| | | | |
|---|---|---|---|
| 4,125,389 | 11/1978 | King | 65/3.12 |
| 4,417,911 | 11/1983 | Cundy et al. | 65/3.12 |
| 4,473,596 | 9/1984 | Beerwald et al. | 427/10 |

FOREIGN PATENT DOCUMENTS

0036191 5/1984 European Pat. Off. .
2079267 1/1982 United Kingdom .

*Primary Examiner*—Shrive Beck
*Assistant Examiner*—Roy V. King
*Attorney, Agent, or Firm*—Millen, White & Zelano

[57] ABSTRACT

For producing a fiberoptic waveguide preforms by plasma pulse-induced chemical vapor deposition (PICVD), blank glass tubes are prepared having a continuously increasing internal diameter in the direction of gas flow. This type of blank compensates for the otherwise occurring decrease in the density of the layer-forming molecules due to pressure drop, thereby permitting the formation of a uniform masswise deposition of layer-forming molecules along the length of the tube. This permits the production of collapsed preforms having a series of coating layers of substantially uniform thickness.

10 Claims, 2 Drawing Sheets

INTERNAL COATING OF A GLASS TUBE BY PLASMA PULSE-INDUCED CHEMICAL VAPOR DEPOSITION

BACKGROUND OF THE INVENTION

The present invention relates in general to a process for fabricating coated glass tubes, especially a fiberoptic waveguide preform by a plasma pulse-induced chemical vapor deposition (PICVD) process and, more particularly, to a process in which a gas stream is passed through a glass tube, and a series of layers of specified thicknesses and of a specific refractive index profile are deposited from the gas stream within a coating region on the inside of the glass tube. The invention also relates to tubular glass blanks having a geometry especially useful for the production of such preforms.

In the PICVD process, for example, as described in EP 0 036 191, short plasma pulses in the low pressure range are used to deposit thin dielectric layers on the inner surface of a glass tube in an axial coating region from a mixture of reaction gases flowing through the tube. The formation of layers is carried out with each plasma pulse virtually simultaneously over the entire section of the tube to be coated. During the breaks between pulses, the tube section is again filled with fresh reaction gas.

The thickness of the layer deposited by a plasma pulse at a particular point in the glass tube is proportional to the density of the layer-forming molecules at that point—before the plasma pulse—each molecule participating in the coating reaction, which thus has a yield of 100%. Insofar as the plasma-generating field has a constant azimuth (axially symmetrical), the thickness of the layers is nevertheless independent of the azimuth because of the circular symmetry of a tube.

Since in a glass tube traversed by a gas there is a pressure drop, i.e., a negative pressure gradient, of the layer-forming gases along the regions of the glass tube being coated, the density of the layer-forming molecules decreases in the direction of gas flow, resulting in a decrease of the rate of coating in the direction of gas flow. Generally, however, a constant layer thickness over the entire coating region is sought. This is particularly the case for internally coated glass tubes from which preforms for fiberoptic waveguides are produced. These preforms are conventionally produced by collapsing the coated tube into a rod, and high standards must be met for the uniformity of the thicknesses of the layers in such a rod.

To achieve a uniform thickness of the deposited layers over the entire coating region, it has been proposed to insert into the glass tube a conical glass rod extending coaxially along the region to be coated (British Patent No. 2,079,267). In this process, it is intended that the periphery of the glass rod be largest at the gas-entry end and smallest at the gas-exit end. This process, however, has the disadvantage that the glass rod is also coated. In addition, the glass rod must be mounted at both ends of the tube to be coated so precisely that deviations in its position as a result of influences during coating are prevented. Also, it is impossible to prevent oscillations in the rod during coating.

One object of the present invention, therefore, is to provide an improved process so as to obtain a relatively constant layer thickness profile along the coating region, without the disadvantages of the prior art.

Another object of the invention is to provide an article of manufacture, namely a tubular glass blank for conducting the process, as well as the resultant coated preform.

Upon further study of the specification and appended claims, other objects and advantages of this invention will become apparent to those skilled in the art.

SUMMARY OF THE INVENTION

To attain the process objects of this invention, there is provided in a process for producing a fiberoptic waveguide preform by plasma pulse-induced chemical vapor deposition in which a gas stream is guided through a glass tube, and a series of layers of specified thickness is deposited from the gas stream within a coating region on the inside of the glass tube, the improvement which comprises passing said gas stream through said glass tube where said tube has an internal diameter that increases continuously within the coating region in the direction of flow of the gas stream.

To attain the object relating to an article of manufacture, the blank glass tube has a continuously increasing internal diameter, and the resultant coated tube has a substantially constant number of coating molecules along the length of the coating. In this way, when the blank is collapsed, there results a substantially axially constant thickness layer profile in the resultant fiberoptic preform.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views and wherein.

DETAILED DESCRIPTION

Figure 1:
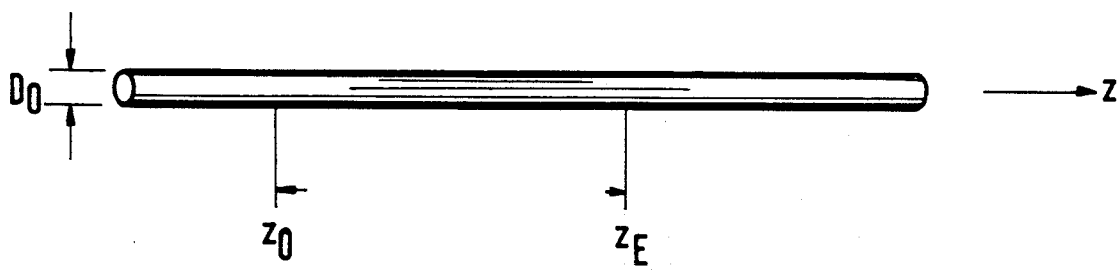
FIG. 1 shows the interior diameter of an untreated glass tube with a constant internal diameter along a section of the tube to be coated.

According to the present invention, it has been found that an axially constant coating rate over the entire coating region is achieved by using tubular glass blanks pretreated to have a continuously increasing internal diameter in the direction of gas flow. This pretreatment comprises conically widening a tube having a constant internal diameter within the coating region in the direction of gas flow, or narrowing it in the direction opposite the direction of gas flow. This has the effect that the axial decrease (i.e., decrease along the length of the tube) in the density of the layer-forming molecules in the direction of gas flow due to the pressure gradient along the region of the tube to be coated is offset by an axial increase in the gas volume. As a result, the number of layer-forming molecules per unit length of the tube is substantially constant.

With the aid of this process, it is possible to provide any desired layer thickness gradient in the coating region of the tube. It is to be understood, moreover, that the invention is applicable to all types of systems. For any given system, a reasonable amount of routine trial-and-error work can be employed, with or without mathematical approaches. Thus, the invention does not reside in the details of how to provide the correct geometry of the conical shape in every situation, since those of ordinary skill in the flow of gases, e.g., physicists, mechanical and chemical engineers, and chemists and ceramicists involved in CVD processes and the like, can routinely adapt this invention to any given system. Consequently, without being bound by the correctness of the following mathematical analysis, it is believed that it will be a helpful guide for obtaining the desired geometry of the blank conical surface to be coated.

In a tube exposed to laminar gas flow and having an internal diameter D, the pressure drops from a value $p_1$ after a tube length of z to a pressure $p(z)$ given by $$p(z) = (p_1^2 - K \cdot M \cdot Z \cdot D^{-4})^{\frac{1}{2}} \tag{1}$$

wherein M is the gas mass flow, and K is a flow constant typical for the respective gas.

The gas, for example, constitutes a mixture consisting of $SiCl_4$ and $O_2$ wherein these components react to form $SiO_2 + 2\ Cl_2$ in the layer-forming reaction.

In the PICVD process, $O_2$ is present in great excess so that the gas mixture practically acts like oxygen in its flow properties.

Since $SiCl_4$ is uniformly distributed in the oxygen, the ratio of the $SiCl_4$ molecular density (moles $SiCl_4$ per unit volume of gas mixture) n at the location 1 to location z is given by $$n_1/n(z) = p_1/p(z)$$

The axial curve of the coating rate is proportional to $SiCl_4$ molecular density and thus to the pressure $p(z)$ and, consequently, is nonuniform.

Since in the PICVD process all $SiCl_4$ molecules distributed over the cross-section of the inner tube surface participate uniformly in the coating of the wall, unless pressure and inner diameter become too large ($p \times D \leq 20$ mbar $\times$ cm), the molecular density, which decreases with decreasing pressure, can be compensated for by enlarging the inner surface of the tube in such a way that the number of $SiCl_4$ molecules contained in one volume element of the tube is constant $$\frac{\pi}{4} D^2 \cdot p \cdot dz = \text{const} \tag{2}$$

wherein dz refers to incremental length.

In this case, there is applied not an axially uniformly thick layer, but rather an axially uniform cross-sectional area of coating material (i.e., an axially uniform application of coating mass) so that, upon collapsing of the tube, a core of substantially uniformly axial deposited material is obtained. Thus, in this embodiment, the thickness of the coating will decrease axially; but, because the periphery to be coated increases axially, the two parameters are adjusted to yield an axially constant mass rate of coating.

A determining equation for the tube inner diameter at point z can be derived from Equation (2):

$$p_0 \cdot D_0^2 = D^2(z) \cdot p(z)$$

wherein $$D(z) = D_0 \cdot \sqrt{\frac{p_0}{p(z)}} \tag{3}$$

wherein $p_0$ and $D_0$ represent the pressure and diameter at the initial point of entrance of the gas into the tube, and $D(z)$ and $p(z)$ represent the diameter and pressure at point z.

Since in a funnel-shaped tube the pressure curve is described by the equation $$p(z) = (p_0^3 - KMz/3\ \{[D_0^3 + D_0 D(z) + D(z)^2]/[D_0^3 D(z)^3]\})^{\frac{1}{2}} \tag{4}$$

the profile of the inner diameter $D(z)$ can be readily determined iteratively from Equations (3) and (4).

Figure 4:
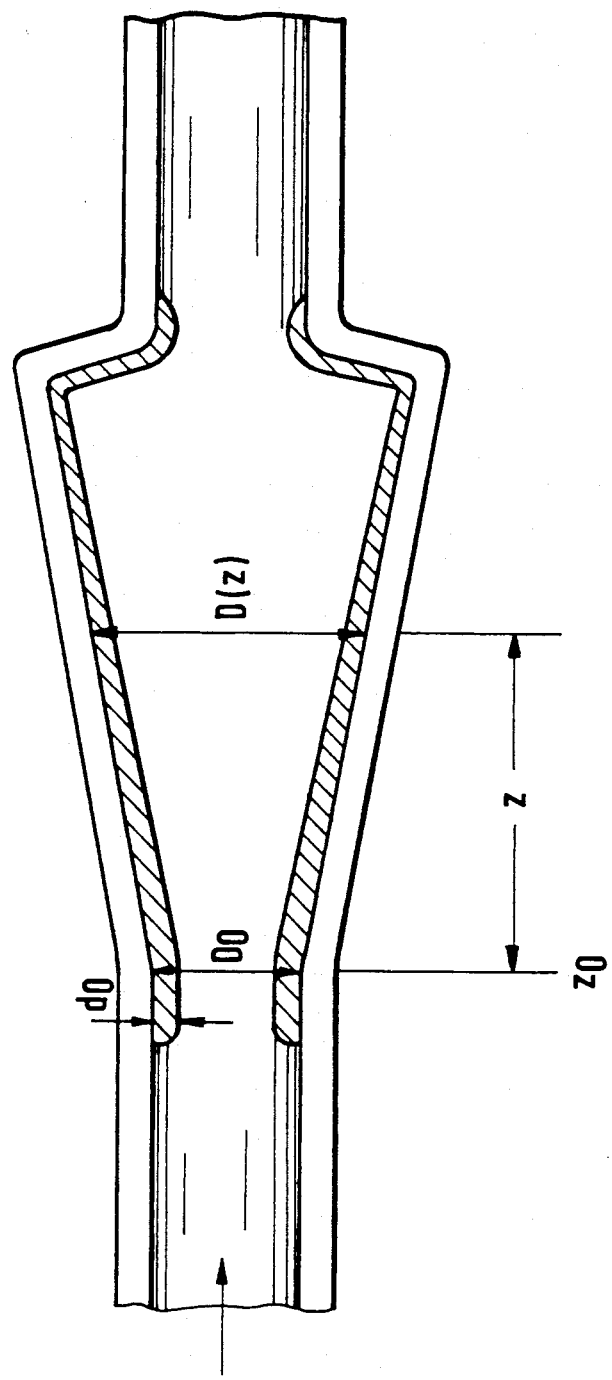
FIG. 4 is a cross-sectional schematic view showing the configuration of a coating in a glass blank according to the invention.

FIG. 4 shows the configuration of the coating in a glass tube widened according to this invention, the internal diameter of this tube having been determined by way of the aforementioned Equations (3) and (4). The coating extends in the tube, widened to a funnel shape, so that series-disposed annular segments result having essentially identical mass and, respectively, identical volume.

The axial variation in the diameter of the tube to be coated can be determined, furthermore, from the profile of the layer thicknesses in the coating region of an untreated tube, i.e., a tube having an internal diameter which is constant over the entire region to be coated (see FIG. 1).

To this end, there is formed from the nonuniform profile of the layer thickness along the tube coordinate z, $d(z)$, the compensation function:

$$K(z) = \frac{d_0(z_0)}{d(z)}$$

where $d_0(z_0)$ represents the maximum layer thickness in the coating region which can be used for the application (for example, the production of preforms). This maximum layer thickness is at the gas-entry end of the coating region if the gas is supplied at the end opposite the microwave connection (input).

Figure 2:
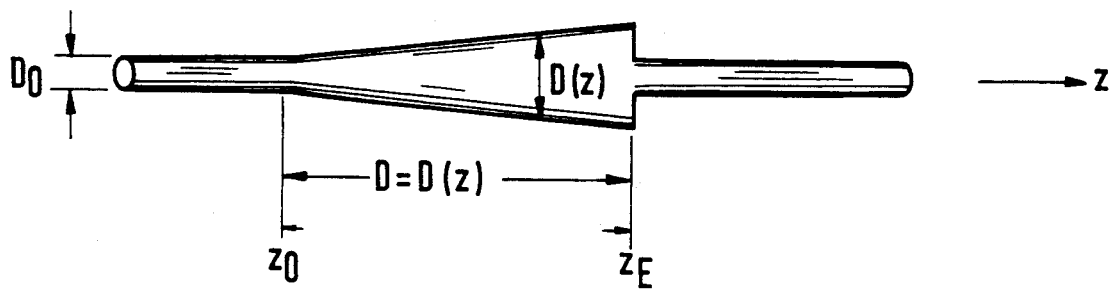
FIG. 2 shows the internal diameter of a glass tube treated according to the present invention, illustrating the increase in the internal diameter along the region to be coated.

Once the axial change in the internal diameter of the tube to be coated has been carried out, $D_0$ represents the internal diameter of the tube in the direction of gas flow as far as the point $z_0$ and $D(z)$ represents the internal diameter as far as the point in the tube which is to be used (compare FIG. 2), where:

$$D(z) = K(z) \times D_0.$$

With this compensation factor, the layer thickness profile overcompensated to a small extent since the assumption of an unchanged pressure drop is made but the treated tube causes a change in the pressure drop. If the compensation calculation is applied again (if necessary with iterations), the deviation of the layer thickness profile from the desired profile can be made as small as is desired.

Figure 3:
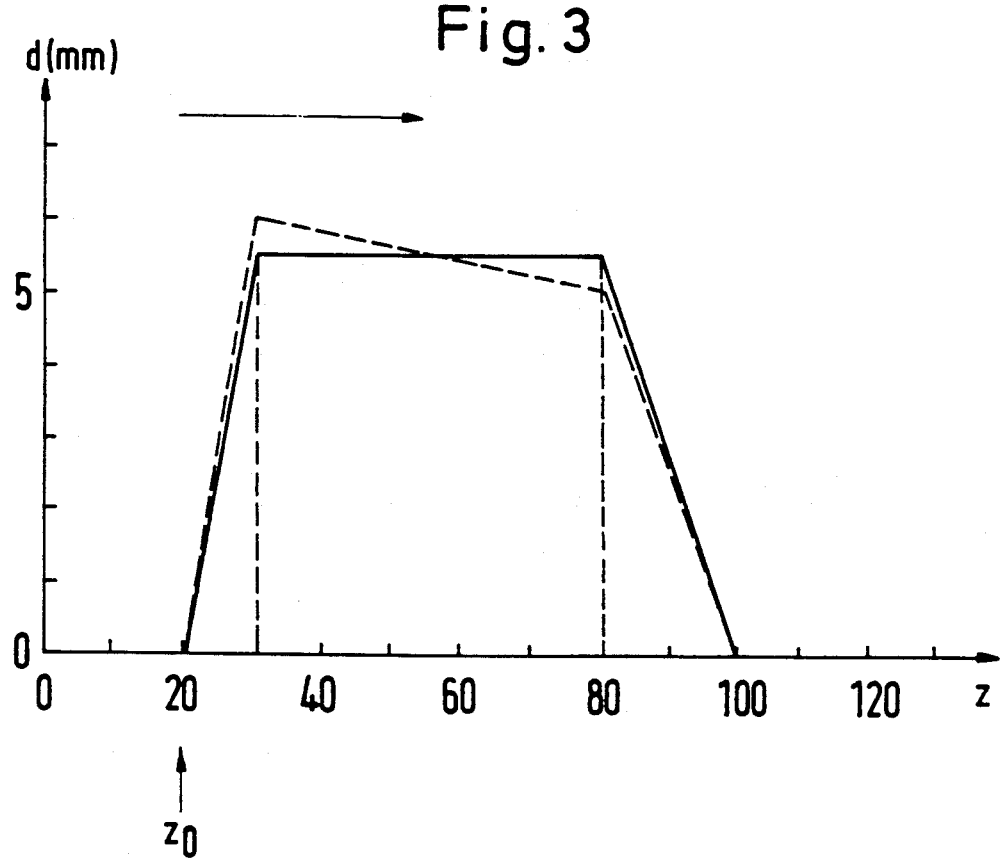
FIG. 3 is a graph of the thicknesses of the core diameter along the length of the coating, comparing an untreated glass tube with a glass tube treated according to the present invention.

FIG. 3 shows the substantially constant profile of the core diameter in the coating region when using the process according to the present invention. By comparison therewith, the profile of the layer thickness without using the process according to the present invention is shown in dotted lines.

It can readily be seen that the coating of a tubular glass blank according to this invention, using the process of this invention, results in a markedly improved, i.e., essentially constant, profile of the core diameter in the fiberoptic waveguide preform to be manufactured.

Without further elaboration, it is believed that one skilled in the art can, using the preceding description, utilize the present invention to its fullest extent. The following preferred specific embodiments, therefore, are to be construed as merely illustrative and limitative of the remainder of the disclosure in any way whatsoever.

In the foregoing and in the following examples, all temperatures are set forth uncorrected in degrees Celsius; and, unless otherwise indicated, all parts and percentages are by weight.

The entire texts of all applications, patents, and publications, if any, cited above and below, and of corresponding West German Application No. P. 38 30 988.2, filed Sept. 12, 1988, as well as German Application No. 39 29 604.0, filed Sept. 6, 1989, are hereby incorporated by reference.

EXAMPLE

In a preferred embodiment, quartz glass tubes having typical dimensions of 20 mm outer diameter and 2 mm wall thickness were used. During the process, the pressure was kept constant at 3 mbar at the gas-exit side. Using a mass flow M of the reaction gases of approximately 250 sccm (=standard cubic centimeters per minute at 1013 mbar, 0° C.), a pressure drop of 0.4 mbar resulted over a length of 50 cm. Since all of the layer-forming molecules present in the tube are deposited on the inner wall of the tube, the deposition rate on the gas-entry side was 13% higher than at the gas-exit end. The tube was widened in a funnel shape so that the maximum widening at the gas-exit end of the coating was 0.26 cm [$Dz_E = 1.86$ cm]. This widening of the tube took place on a glass lathe. To this end, the clamped tube is connected to a gas control system such that the pressure in the quartz glass tube can be regulated very precisely in the 1/10 mbar region. At an excess pressure of 2 mbar, the tube is heated, using an $H_2/O_2$ burner, to precisely that temperature (2100° C.) that causes it to soften. The pressure, burner temperature, and burner feed rate are optimized so that a continuous widening is achieved. This resulted in a coating with a core diameter of the preform which, after the collapsing step, was uniform over the entire coating region.

The funnel portion of the blanks of the invention can generally be described as having an angle with respect to the axis of the tube of about 0.05 to 10.0°, preferably 0.1 to 2.0°. Otherwise, the preferred blank uncoated glass tubes are characterized by geometries which are conventionally employed in the production of fiberoptic preforms as described in the literature. Exemplary ranges for the dimensions of such blanks are:

| | General | Preferred |
|---|---|---|
| Tube inner diameter (cm) | 0.5–3.0 | 1.2–2.0 |
| Tube wall thickness (mm) | 0.5–4.0 | 1.0–2.5 |
| Overall tube length (cm) | 50–200 | 100–150 |
| Length of coating region (cm) | 10–100 | 40–70 |
| Length of connecting pieces: | | |
| Gas inlet to beginning of coating region $Z_0$ (cm) | $\geq 15$ | |
| End of coating region to gas outlet | $\geq 20$ | |

The coating is generally in the range of 0.001 to 1.5 mm, preferably 0.1 to 1.0 mm thickness.

In general, the connecting pieces are "right cylinders", i.e., constant diameter cylinders, but it is also possible to use alternative configurations for particular systems. In any case, at least one, if not both, connecting pieces will generally have different geometric specifications than the funnel-shaped coating region.

The collapsed preforms of the present invention can be drawn into fiberoptic communication lines, e.g., for telephone lines and computers. Laser light, for example, can then be used to effect communication. To the extent that the present invention provides preforms with improved axially uniform coatings, it stands to reason that the resultant drawn fibers will also be improved.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a process for producing a fiberoptic waveguide preform by plasma pulse-induced chemical vapor deposition, in which a gas stream is guided through a glass tube and a sequence of layers of a specified thickness and of a specific refractive index profile is deposited from the gas stream within a coating region on the inside of the glass tube, the improvement which comprises passing said gas stream through said glass tube where said tube has an internal diameter that increases continuously to a predetermined extent within the coating region in the direction of flow of the gas stream.

2. A process according to claim 1, further comprising preceding steps to determine the extent of the continuous increase of the glass tube, said preceding steps comprising conducting the coating process with a glass tube having a uniform internal diameter, measuring resultant axial coating thicknesses, and calculating from the resultant data of the axial coating thicknesses, the extent of the continuous increase of a tube having a continuously increased internal diameter.

3. A process according to claim 1, wherein the increase in the internal diameter of the glass tube substantially offsets any gradient which would otherwise occur.

4. In a process for producing a fiberoptic waveguide preform by plasma pulse-induced chemical vapor deposition in which a layer-forming gas stream is passed through an uncoated glass tube and a series of layers of specified thickness are deposited from the layer-forming gas stream within a coating region on the inside of the glass tube, the improvement comprising applying an axially uniform cross-sectional area of layers of coating material along the length of the region to be coated by increasing the internal diameter of the tube to a predetermined extent in the direction of gas flow to substantially, but not completely, offset the effect of the pressure drop of the layer-forming gas stream as it passes through the coating region.

5. A process according to claim 4, comprising a further step of collapsing the coated blank to form a preform having a substantially constant layer thickness profile.

6. A process according to claim 5, further comprising drawing said preform to form a fiberoptic waveguide.

7. A process according to claim 6, further comprising passing a laser light through said fiberoptic waveguide.

8. A process according to claim 1, comprising a further step of collapsing the coated blank to form a preform having a substantially constant layer thickness profile.

9. A process according to claim 8, further comprising drawing said preform to form a fiberoptic waveguide.

10. A process according to claim 9, further comprising passing a laser light through said fiberoptic waveguide.

* * * * *